United States Patent
Salah et al.

(10) Patent No.: US 11,424,868 B2
(45) Date of Patent: Aug. 23, 2022

(54) METHOD AND APPARATUS FOR USER EQUIPMENT PROCESSING TIMELINE ENHANCEMENT IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 124 days.

(21) Appl. No.: 16/747,505

(22) Filed: Jan. 20, 2020

(65) Prior Publication Data

US 2020/0244404 A1 Jul. 30, 2020

Related U.S. Application Data

(60) Provisional application No. 62/796,199, filed on Jan. 24, 2019.

(51) Int. Cl.
*H04L 1/18* (2006.01)
*H04W 72/04* (2009.01)

(52) U.S. Cl.
CPC ......... *H04L 1/1812* (2013.01); *H04W 72/042* (2013.01)

(58) Field of Classification Search
CPC ..................... H04L 1/1812; H04W 72/042
See application file for complete search history.

(56) References Cited

U.S. PATENT DOCUMENTS

| 8,817,711 | B2* | 8/2014 | Baker | H04L 1/1874 370/329 |
| 9,538,546 | B2* | 1/2017 | Sachs | H04W 52/0216 |
| 10,375,725 | B2* | 8/2019 | Lee | H04L 1/1887 |
| 10,660,077 | B2* | 5/2020 | MolavianJazi | H04W 52/146 |
| 10,735,160 | B2* | 8/2020 | He | H04W 72/14 |
| 10,742,362 | B2* | 8/2020 | Lee | H04L 1/1861 |
| 10,812,968 | B2* | 10/2020 | Li | H04W 72/0453 |

(Continued)

FOREIGN PATENT DOCUMENTS

| CN | 106533633 A | 3/2017 |
| CN | 107104763 A | 8/2017 |

(Continued)

OTHER PUBLICATIONS

Fraunhofer HHI et al., Scheduling/HARQ Processing Timeline Enhancements for NR URLLC, Oct. 8, 2018, 3GPP TSG RAN WG1 Meeting #94bis, Tdoc: R1-1810486 (Year: 2018).*

(Continued)

*Primary Examiner* — Eric Nowlin
(74) *Attorney, Agent, or Firm* — Han IP PLLC; Andy M. Han (57) ABSTRACT

Various solutions for processing timeline enhancement with respect to user equipment and network apparatus in mobile communications are described. An apparatus may determine a normal processing time. The apparatus may determine a specific processing time. The apparatus may use the normal processing time when performing an initial transmission. The apparatus may use the specific processing time when performing a retransmission.

16 Claims, 3 Drawing Sheets

(56) References Cited

U.S. PATENT DOCUMENTS

| | | | | |
|---|---|---|---|---|
| 10,986,591 | B2* | 4/2021 | MolavianJazi | H04W 52/146 |
| 10,986,695 | B1* | 4/2021 | Babaei | H04W 72/0453 |
| 11,129,148 | B2* | 9/2021 | MolavianJazi | H04W 52/16 |
| 2007/0079207 | A1* | 4/2007 | Seidel | H04L 1/1845 |
| | | | | 714/748 |
| 2012/0054573 | A1* | 3/2012 | Kanemoto | H04L 1/1887 |
| | | | | 714/748 |
| 2013/0170372 | A1* | 7/2013 | Zhang | H04L 1/1854 |
| | | | | 370/252 |
| 2015/0043461 | A1* | 2/2015 | Sachs | H04W 72/12 |
| | | | | 370/329 |
| 2017/0310431 | A1* | 10/2017 | Iyer | H04L 1/1864 |
| 2018/0049234 | A1* | 2/2018 | Lee | H04L 1/1822 |
| 2018/0123767 | A1* | 5/2018 | Islam | H04L 1/1816 |
| 2018/0199334 | A1* | 7/2018 | Ying | H04W 72/042 |
| 2018/0242356 | A1* | 8/2018 | Wu | H04L 1/1893 |
| 2019/0052426 | A1* | 2/2019 | He | H04W 72/042 |
| 2019/0141520 | A1* | 5/2019 | Li | H04W 88/06 |
| 2019/0159231 | A1* | 5/2019 | Soriaga | H04W 72/1247 |
| 2019/0253203 | A1* | 8/2019 | Prakash | H04W 72/14 |
| 2019/0289622 | A1* | 9/2019 | Chatterjee | H04W 72/0446 |
| 2019/0363857 | A1* | 11/2019 | Hwang | H04L 1/1854 |
| 2019/0372721 | A1* | 12/2019 | Lee | H04L 1/1864 |
| 2020/0037352 | A1* | 1/2020 | Yang | H04W 72/0406 |
| 2020/0044780 | A1* | 2/2020 | Lei | H04L 1/1893 |
| 2020/0053657 | A1* | 2/2020 | MolavianJazi | H04W 52/281 |
| 2020/0053710 | A1* | 2/2020 | MolavianJazi | H04W 52/16 |
| 2020/0053724 | A1* | 2/2020 | MolavianJazi | H04W 72/10 |
| 2020/0100126 | A1* | 3/2020 | Salah | H04W 28/0278 |
| 2020/0145141 | A1* | 5/2020 | Park | H04L 5/00 |
| 2020/0195383 | A1* | 6/2020 | Liu | H04L 1/1896 |
| 2020/0213994 | A1* | 7/2020 | Feng | H04L 5/0007 |
| 2020/0244404 | A1* | 7/2020 | Salah | H04L 1/188 |
| 2020/0259896 | A1* | 8/2020 | Sachs | G06K 19/06028 |
| 2020/0266954 | A1* | 8/2020 | Salah | H04W 72/1231 |
| 2020/0267659 | A1* | 8/2020 | MolavianJazi | H04W 52/48 |
| 2020/0267667 | A1* | 8/2020 | MolavianJazi | H04W 72/14 |
| 2020/0329437 | A1* | 10/2020 | MolavianJazi | H04W 76/15 |
| 2020/0358563 | A1* | 11/2020 | Lee | H04L 5/0055 |
| 2021/0029706 | A1* | 1/2021 | Zhou | H04L 5/0044 |
| 2021/0029719 | A1* | 1/2021 | Zhou | H04L 1/1874 |
| 2021/0044962 | A1* | 2/2021 | Li | H04B 7/0413 |
| 2021/0144708 | A1* | 5/2021 | Wang | H04W 72/0453 |
| 2021/0144799 | A1* | 5/2021 | Babaei | H04W 72/0453 |
| 2021/0168849 | A1* | 6/2021 | Oh | H04W 72/042 |
| 2021/0184801 | A1* | 6/2021 | El Hamss | H04L 1/1819 |
| 2021/0184804 | A1* | 6/2021 | Park | H04L 5/0078 |
| 2021/0204358 | A1* | 7/2021 | Babaei | H04W 72/042 |
| 2021/0211992 | A1* | 7/2021 | MolavianJazi | H04W 52/146 |
| 2022/0007360 | A1* | 1/2022 | MolavianJazi | H04W 72/10 |
| 2022/0046557 | A1* | 2/2022 | MolavianJazi | H04W 24/10 |

FOREIGN PATENT DOCUMENTS

| | | | | |
|---|---|---|---|---|
| CN | 107306149 | A | 10/2017 | |
| CN | 111742513 | A * | 10/2020 | H04L 5/0078 |
| EP | 3672342 | A1 * | 6/2020 | H04L 5/0044 |
| EP | 3672342 | A4 * | 8/2020 | H04W 72/044 |
| EP | 3780725 | A1 * | 2/2021 | H04L 5/0053 |
| GB | 2572646 | A * | 10/2019 | H04L 5/0044 |
| WO | WO-2016148358 | A1 * | 9/2016 | H04L 1/18 |
| WO | WO-2019213821 | A1 * | 11/2019 | H04B 7/0626 |
| WO | WO-2020151747 | A1 * | 7/2020 | H04L 5/0078 |
| WO | WO-2020169198 | A1 * | 8/2020 | H04L 1/1864 |
| WO | WO-2021090504 | A1 * | 5/2021 | H04W 28/04 |
| WO | WO-2021162620 | A1 * | 8/2021 | |

OTHER PUBLICATIONS

Ericsson, Scheduling/HARQ/CSI Processing Timeline Enhancements for NR URLLC, Dec. 12, 2018, 3GPP TSG-RAN WG1 Meeting #95, Tdoc: R1-1812156 (Year: 2018).*

Vivo, Enhancement for Scheduling/HARQ/CSI processing timeline, Dec. 12, 2018, 3GPP TSG-RAN WG1 Meeting #95, Tdoc: R1-1812315 (Year: 2018).*

MediaTek Inc., Study and evaluation of scheduling, HARQ and CSI processing timeline, Dec. 12, 2018, 3GPP TSG-RAN WG1 Meeting #95, Tdoc: R1-1812377 (Year: 2018).*

Intel Corporation, On enhancements to UE processing times for eURLLC, Dec. 12, 2018, 3GPP TSG-RAN WG1 Meeting #95, Tdoc: R1-1812504 (Year: 2018).*

LG Electronics, Scheduling/HARQ processing timeline enhancements for NR URLLC, Dec. 12, 2018, 3GPP TSG-RAN WG1 Meeting #95, Tdoc: R1-1812575 (Year: 2018).*

Samsung, Potential enhancements for scheduling&HARQ&CSI processing timeline, Dec. 12, 2018, 3GPP TSG-RAN WG1 Meeting #95, Tdoc: R1-1812997 (Year: 2018).*

Nokia et al., Enhancements to scheduling/HARQ/CSI processing timeline for NR URLLC, Dec. 12, 2018, 3GPP TSG-RAN WG1 Meeting #95, Tdoc: R1-1813116 (Year: 2018).*

Fraunhofer HHI et al., Scheduling/HARQ Processing Timeline Enhancements for NR URLLC, Dec. 12, 2018, 3GPP TSG-RAN WG1 Meeting #95, Tdoc: R1-1813146 (Year: 2018).*

NTT Docomo, Inc., Enhancements to Scheduling/HARQ/CSI Processing timeline for URLLC, Dec. 12, 2018, 3GPP TSG-RAN WG1 Meeting #95, Tdoc: R1-1813327 (Year: 2018).*

Qualcomm Incorporated, Scheduling/HARQ/CSI Processing Timeline for eURLLC, Dec. 12, 2018, 3GPP TSG-RAN WG1 Meeting #95, Tdoc: R1-1813436 (Year: 2018).*

Qualcomm Incorporated, Summary for Potential Enhancements to Scheduling/HARQ/CSI Processing Timeline, Dec. 12, 2018, 3GPP TSG-RAN WG1 Meeting #95, Tdoc: R1-1814094 (Year: 2018).*

Qualcomm Incorporated, Summary for Potential Enhancements to Scheduling/HARQ/CSI Processing Timeline, Dec. 12, 2018, 3GPP TSG-RAN WG1 Meeting #95, Tdoc: R1-1814173 (Year: 2018).*

Qualcomm Incorporated, Summary for Potential Enhancements to Scheduling/HARQ/CSI Processing Timeline, Dec. 12, 2018, 3GPP TSG-RAN WG1 Meeting #95, Tdoc: R1-1814283 (Year: 2018).*

Huawei et al., Enhancements to scheduling/HARQ/CSI processing timeline for URLLC, Jan. 21, 2019, 3GPP TSG RAN WG1 Ad-Hoc Meeting 1901, Tdoc: R1-1900047 (Year: 2019).*

ZTE, On scheduling/HARQ processing timeline for URLLC, Jan. 21, 2019, 3GPP TSG RAN WG1 Ad-Hoc Meeting 1901, Tdoc: R1-1900072 (Year: 2019).*

Vivo, Enhancement for Scheduling/HARQ/CSI processing timeline, Jan. 21, 2019, 3GPP TSG RAN WG1 Ad-Hoc Meeting 1901, Tdoc: R1-1900129 (Year: 2019).*

Ericsson, Scheduling/HARQ/CSI Processing Timeline Enhancements for NR URLLC, Jan. 21, 2019, 3GPP TSG RAN WG1 Ad-Hoc Meeting 1901, Tdoc: R1-1900161 (Year: 2019).*

MediaTek Inc., Study and evaluation of scheduling, HARQ and CSI processing timeline, Jan. 21, 2019, 3GPP TSG RAN WG1 Ad-Hoc Meeting 1901, Tdoc: R1-1900211 (Year: 2019).*

Oppo, Enhancements on scheduling and HARQ processing timeline, Jan. 21, 2019, 3GPP TSG RAN WG1 Ad-Hoc Meeting 1901, Tdoc: R1-1900284 (Year: 2019).*

Sony, Considerations on UE Processing Timeline, Jan. 21, 2019, 3GPP TSG RAN WG1 Ad-Hoc Meeting 1901, Tdoc: R1-1900373 (Year: 2019).*

Intel Corporation, On enhancements to Scheduling/HARQ/CSI processing, Jan. 21, 2019, 3GPP TSG RAN WG1 Ad-Hoc Meeting 1901, Tdoc: R1-1900496 (Year: 2019).*

LG Electronics, Scheduling/HARQ processing timeline enhancements for NR URLLC, Jan. 21, 2019, 3GPP TSG RAN WG1 Ad-Hoc Meeting 1901, Tdoc: R1-1900594 (Year: 2019).*

Qualcomm Incorporated, Processing Timeline Enhancements for eURLLC, Jan. 21, 2019, 3GPP TSG RAN WG1 Ad-Hoc Meeting 1901, Tdoc: R1-1900899 (Year: 2019).*

Nokia et al., Enhancements to scheduling/HARQ/CSI processing timeline for NR URLLC, Jan. 21, 2019, 3GPP TSG RAN WG1 Ad-Hoc Meeting 1901, Tdoc: R1-1900930 (Year: 2019).*

NTT Docomo, Inc., Enhancements to Scheduling/HARQ/CSI Processing timeline for URLLC, Jan. 21, 2019, 3GPP TSG RAN WG1 Ad-Hoc Meeting 1901, Tdoc: R1-1900972 (Year: 2019).*

(56) References Cited

OTHER PUBLICATIONS

ITRI, Enhancement of processing timeline for intra-UE prioritization and multiplexing, Jan. 21, 2019, 3GPP TSG RAN WG1 Ad-Hoc Meeting 1901, Tdoc: R1-1900989 (Year: 2019).*

Samsung, Potential enhancements for scheduling&HARQ&CSI processing timeline, Jan. 21, 2019, 3GPP TSG RAN WG1 Ad-Hoc Meeting 1901, Tdoc: R1-1901069 (Year: 2019).*

Fraunhofer HHI et al., Scheduling/HARQ Processing Timeline Enhancements for NR URLLC, Jan. 21, 2019, 3GPP TSG RAN WG1 Ad-Hoc Meeting 1901, Tdoc: R1-1901152 (Year: 2019).*

Huawei et al., Discussion on UE HARQ processing timeline, Jan. 21, 2019, 3GPP TSG RAN WG1 Ad-Hoc Meeting 1901, Tdoc: R1-1901265 (Year: 2019).*

LG Electronics, Scheduling/HARQ processing timeline enhancements for NR URLLC, Jan. 21, 2019, 3GPP TSG RAN WG1 Ad-Hoc Meeting 1901, Tdoc: R1-1901288 (Year: 2019).*

Qualcomm Incorporated, Summary for Potential Enhancements to Scheduling/HARQ/CSI Processing Timeline, Jan. 21, 2019, 3GPP TSG RAN WG1 Ad-Hoc Meeting 1901, Tdoc: R1-1901313 (Year: 2019).*

Qualcomm Incorporated, Processing Timeline Enhancements for eURLLC, Jan. 21, 2019, 3GPP TSG RAN WG1 Ad-Hoc Meeting 1901, Tdoc: R1-1901314 (Year: 2019).*

Huawei et al., Enhancements to scheduling/HARQ/CSI processing timeline for URLLC, Jan. 21, 2019, 3GPP TSG RAN WG1 Ad-Hoc Meeting 1901, Tdoc: R1-1901345 (Year: 2019).*

Ericsson, Scheduling/HARQ/CSI Processing Timeline Enhancements for NR URLLC, Jan. 21, 2019, 3GPP TSG RAN WG1 Ad-Hoc Meeting 1901, Tdoc: R1-1901349 (Year: 2019).*

NTT Docomo, Inc., Enhancements to Scheduling/HARQ/CSI Processing timeline for URLLC, Jan. 21, 2019, 3GPP TSG RAN WG1 Ad-Hoc Meeting 1901, Tdoc: R1-1901355 (Year: 2019).*

Qualcomm Incorporated, Summary for Potential Enhancements to Scheduling/HARQ/CSI Processing Timeline, Jan. 21, 2019, 3GPP TSG RAN WG1 Ad-Hoc Meeting 1901, Tdoc: R1-1901382 (Year: 2019).*

Qualcomm Incorporated, Summary for Potential Enhancements to Scheduling/HARQ/CSI Processing Timeline, Jan. 21, 2019, 3GPP TSG RAN WG1 Ad-Hoc Meeting 1901, Tdoc: R1-1901451 (Year: 2019).*

Qualcomm, Email discussion/approval on converging the proposals for eURLLC processing timeline, Jan. 21, 2019, 3GPP TSG RAN WG1 Ad-Hoc Meeting 1901, Tdoc: R1-1901472 (Year: 2019).*

Huawei et al., Enhancements to scheduling/HARQ/CSI processing timeline for URLLC, Nov. 12, 2018, 3GPP TSG RAN WG1 Meeting #95, Agenda Item 7.2.6.1.4, Tdoc: R1-1812224 (Year: 2018).*

Qualcomm, LS on RRC Parameter for Capability 2 Processing Time, Nov. 12, 2016, 3GPP TSG-RAN WG1 Meeting #95, Tdoc: R1-1814333 (Year: 2018).*

Qualcomm et al., Draft CR to 38.214 Update to reflect new RRC parameter to enable capability 2, Nov. 12, 2018, 3GPP TSG RAN WG1 #95, Tdoc: R1-1814334 (Year: 2018).*

RAN1, LS on RRC Parameter for Capability 2 Processing Time, Nov. 12, 2018, 3GPP TSG RAN WG1 #95, Tdoc: R1-1814349 (Year: 2018).*

Panasonic, On NR URLLC scheduling and UL cancellation processing timeline, Jan. 21, 2019, 3GPP TSG RAN WG1 Ad-Hoc Meeting 1901, Tdoc: R1-1900675 (Year: 2019).*

RAN1, LS on RRC Parameter for Capability 2 Processing Time, Nov. 12, 2018, 3GPP TSG RAN WG2#104, Tdoc: R2-1819108 (Year: 2018).*

China National Intellectual Property Administraion, International Search Report and Written Opinion for PCT/CN2020/073809, dated Apr. 22, 2020.

Nokia et al., Enhancements to scheduling/HARQ/CSI processing timeline for NR URLLC, R1-1810670, 3GPP TSG RAN WG1 Meeting #94-bis, Chengdu, China, Oct. 8-12, 2018.

* cited by examiner

METHOD AND APPARATUS FOR USER EQUIPMENT PROCESSING TIMELINE ENHANCEMENT IN MOBILE COMMUNICATIONS

CROSS REFERENCE TO RELATED PATENT APPLICATION(S)

The present disclosure is part of a non-provisional application claiming the priority benefit of U.S. Patent Application No. 62/796,199, filed on 24 Jan. 2019, the content of which being incorporated by reference in its entirety.

TECHNICAL FIELD

The present disclosure is generally related to mobile communications and, more particularly, to processing timeline enhancement with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), aggressive user equipment (UE) processing timeline for uplink transmission and downlink reception is proposed to reduce transmission latency and facilitate uplink/downlink transmissions. For example, UE processing time N1 is defined as the time needed for the physical downlink shared channel (PDSCH) decoding and the hybrid automatic repeat request-acknowledgement (HARQ-ACK) feedback preparation. UE processing time N2 is defined as the physical uplink shared channel (PUSCH) preparation time. The UE processing timeline may be dominated by N1 and/or N2. Further enhancement to the UE processing timeline is needed in NR to further reduce the latency and accommodate larger number of uplink/downlink transmissions.

Although using more aggressive N1 and/or N2 will reduce the overall latency, such enhancement will lead to increased UE complexity and will severely put a lot of pressure and constraints on UE implementation. For example, in order to achieve more aggressive N1 and/or N2, the UE may need to be implemented by hardware components with better performance which leads to higher manufacture cost. To shorten the UE processing timeline, more complex and massive computation may also be raised on the UE which leads to further power consumption and complicated UE implementation. Forcing to apply more aggressive N1 and/or N2 will lead to severe challenges on UE implementation and cost. Thus, an intermediate solution is needed to allow for a reduced processing time while still not putting a lot of pressure on the UE implementation and architecture.

Accordingly, how to improve UE processing timeline and avoid increasing complexity on the UE implementation and architecture becomes an important aspect for the newly developed wireless communication network. Therefore, it is needed to provide proper schemes for the UE to shorten processing timeline and keep some flexibility on design complexity.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to processing timeline enhancement with respect to user equipment and network apparatus in mobile communications.

In one aspect, a method may involve an apparatus determining a normal processing time. The method may also involve the apparatus determining a specific processing time. The method may further involve the apparatus using the normal processing time when performing an initial transmission. The method may further involve the apparatus using the specific processing time when performing a retransmission.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising determining a normal processing time. The processor may also perform operations comprising determining a specific processing time. The processor may further perform operations comprising using the normal processing time when performing an initial transmission. The processor may further perform operations comprising using the specific processing time when performing a retransmission.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to processing timeline enhancement with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, aggressive UE processing timeline for uplink transmission (e.g., PUSCH preparation) and downlink reception (e.g., PDSCH processing) is proposed to reduce transmission latency and facilitate uplink/downlink transmissions. For example, UE processing time N1 is defined as the time needed for the PDSCH decoding and the HARQ-ACK feedback preparation. UE processing time N2 is defined as the PUSCH preparation time. The UE processing timeline may be dominated by N1 and/or N2. Further enhancement to the UE processing timeline is needed in NR to further reduce the latency and accommodate larger number of uplink/downlink transmissions.

Although using more aggressive N1 and/or N2 will reduce the overall latency, such enhancement will lead to increased UE complexity and will severely put a lot of pressure and constraints on UE implementation. For example, in order to achieve more aggressive N1 and/or N2, the UE may need to be implemented by hardware components with better performance which leads to higher manufacture cost. To shorten the UE processing timeline, more complex and massive computation may also be raised on the UE which leads to further power consumption and complicated UE implementation. Forcing to apply more aggressive N1 and/or N2 will lead to severe challenges on UE implementation and cost. Accordingly, an intermediate solution is needed to allow for a reduced processing time while still not putting a lot of pressure on the UE implementation and architecture.

In view of the above, the present disclosure proposes a number of schemes pertaining to processing timeline enhancement with respect to the UE and the network apparatus. According to the schemes of the present disclosure, a specific processing time is defined for the retransmissions. The UE may be configured with a normal processing time and a specific processing time. The specific processing time is shorter than the normal processing time. For some transmissions (e.g., initial transmission), the UE may use the normal processing time. For some transmissions (e.g., retransmission), the UE may use the specific processing time. The UE may be able to shorten the processing timeline while performing the retransmissions and have enough processing time while performing the initial transmissions. Accordingly, the UE may have flexibility to enhance the processing timeline without a lot of pressure on the UE implementation and architecture.

Since most of the tasks are very similar between the initial transmission and the retransmission, further optimization of the UE architecture is possible. For example, the PUSCH transmission can be dynamically scheduled by an uplink grant in a downlink control information (DCI), or semi-statically configured to operate according to the configured grant. The PUSCH preparation time may involve multiple tasks that the UE should handle. The UE may need to decode the uplink DCI grant and parse the DCI to acquire the required information for the uplink transmission. The UE may need to determine target code rate and perform channel encoding and modulation. The UE may need to apply the redundancy version and read the data from the buffer. The UE may also need to perform radio frequency (RF) front end calibration. Between the initial transmission and the retransmission, multiple tasks for uplink or downlink transmission may be repeated at the UE side. This may be optimized at the UE architecture and design implementation. For example, the data from the initial transmission may be stored and re-used for the retransmission which will save all the re-encoding, the modulation efforts, etc. This type of optimization will lead to reduced processing time when the retransmission occurs.

Figure 1:
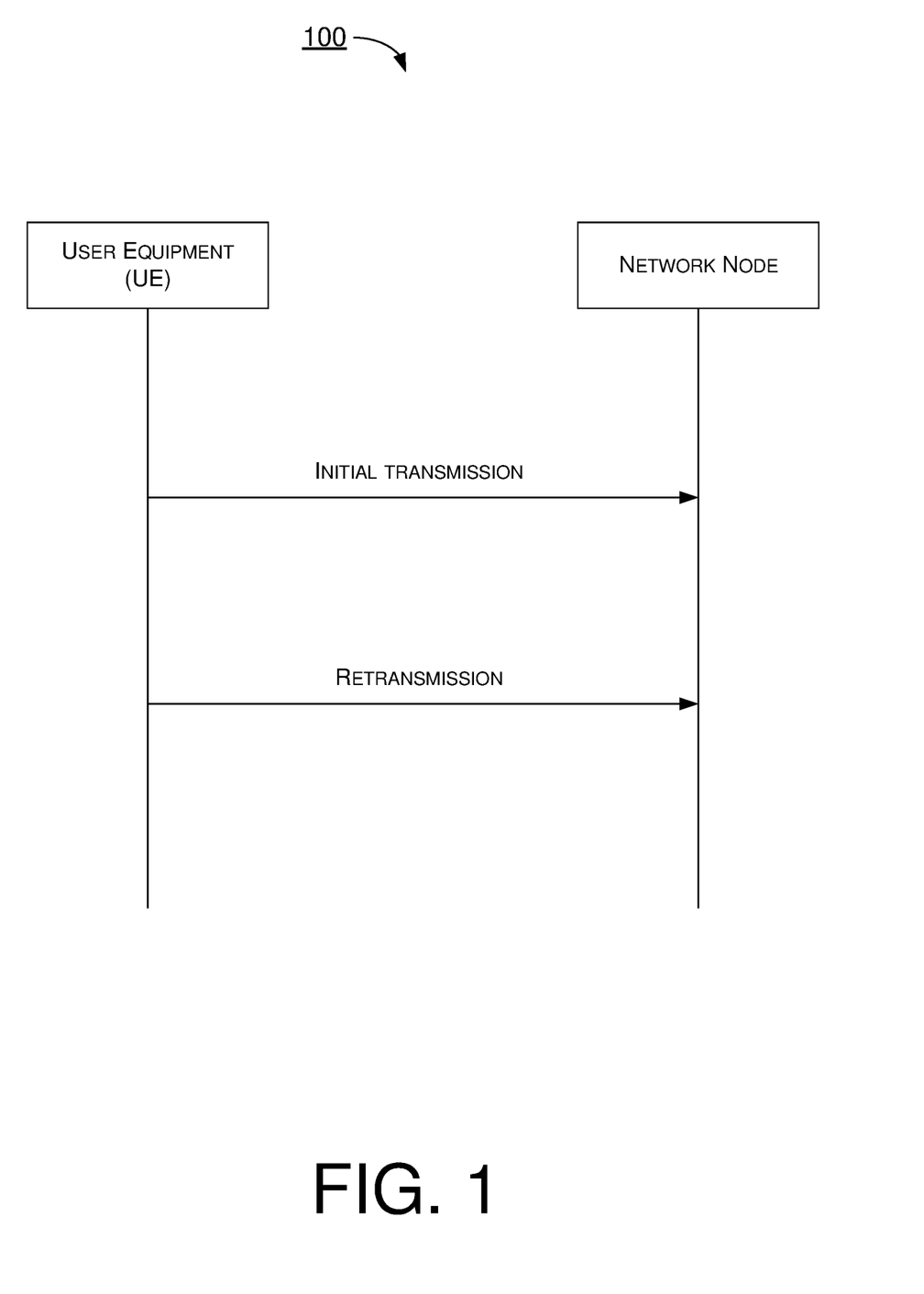
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The UE may be configured to perform an initial transmission (e.g., PUSCH transmission) to transmit uplink data to the network node. The PUSCH transmission may be dynamically scheduled by an uplink grant in a DCI, or semi-statically configured to operate according to the configured grant. The UE may be configured with a HARQ process. In an event that the initial transmission is not received by the network node, the network node may transmit a negative acknowledgement (NACK) to the UE or may not transmit any feedback. In an event that the NACK is received or no response is received from the network node, the UE may be configured to perform a retransmission to retransmit the uplink data.

The UE may be configured to determine a normal processing time. The normal processing time may comprise a first normal processing time N1 and a second normal processing time N2. The UE may be configured to determine a specific processing time. The specific processing time may comprise a first specific processing time N1' and a second specific processing time N2'. N1 and N1' may be defined as the time needed for the PDSCH decoding and the HARQ-ACK feedback preparation. N2 and N2' may be defined as the PUSCH preparation time. The value of the normal processing time and the specific processing time may be pre-stored in the UE or configured by the network node. For example, the specific processing time N1'/N2' may be configured by the radio resource control (RRC) signalling or dynamically signalled. The UE may be configured to receive a configuration of the specific processing time.

The UE may be configured to use the normal processing time when performing the initial transmission. The UE may be configured to use the specific processing time when performing a retransmission. The first specific processing time N1' is less than the first normal processing time N1. The second specific processing time N2' is less than the second normal processing time N2. Specifically, since most of the tasks are very similar between the initial transmission and the retransmission, the UE may be configured to use more aggressive processing time or retransmission specific processing time (e.g., the specific processing time) for the retransmission. For example, the UE may be configured to store the data from the initial transmission. The UE may be configured to reuse the data to perform the retransmission. Thus, the UE may skip some similar tasks (e.g., determining target code rate, channel encoding and modulation, or other preparation tasks) when performing the retransmission. Accordingly, more aggressive processing time (e.g., shorter processing time) may be defined for the retransmission. The UE may be configured to use more aggressive processing time for the retransmission. This scheme can be applied to the PUSCH preparation and also the PDSCH processing.

Multiple schemes may be explored in defining the aggressive/specific processing time (e.g., N1' and/or N2'). For example, the specific processing time may be explicitly specified in the $3^{rd}$ Generation Partnership Project (3GPP) specifications. N1' and N2' may be defined per sub-carrier spacing (SCS), where N1'≤N1 and N2'≤N2. Multiple values of N1' and N2' may also be defined per SCS. It may be equal to 0 for certain SCS (e.g., large SCS). Alternatively, the UE may be configured to determine the specific processing time according to an offset value. An offset $\Delta$ may be specified for all numerologies or per numerology. For example, the specific processing time for the retransmission may be determined by N1−$\Delta$. Multiple values of $\Delta$ may also be defined per SCS.

The UE may further be configured to determine whether a condition is satisfied. The UE may enable the using of the specific processing time (e.g., N1' and/or N2') in an event that the condition is satisfied. For example, the condition may comprise using a processing capability #3 to perform the retransmission. A new UE processing capability #3 may be defined to be used for all transmissions or for the retransmission only. The UE may be configured to report its capability to use it for all transmissions or for retransmission only. When performing the retransmission, the UE may be configured to use the UE processing capability #3 by applying the specific processing time. Alternatively, the condition may comprise that a number of physical downlink control channel (PDCCH) monitoring occasions is greater than a threshold. The specific processing time may be triggered when the number of PDCCH monitoring occasions is greater than a certain threshold. For example, the specific processing time may be used when PDCCH monitoring occasions per slot is equal or greater than 4.

The specific processing time may be mapped to certain radio network temporary identifiers (RNTIs), search space, DCI format or size, control resource set (CORESET). The UE may derive the specific processing time based on that mapping. For example, different RNTI or DCI format may be defined for ultra-reliable and low latency communications (URLLC) services. The use of the specific processing time may be enabled/disabled semi-statically or dynamically. For example, the RRC+DCI configuration may be used. Multiple processing times may be configured or pre-specified via the RRC signalling and the value to be used may be indicated to the UE for each transmission. The indication may be explicit in the DCI or implicitly derived from RNTIs, search spaces, DCI format or size, CORESET, etc. This may be useful in case of multiple simultaneous services with different latency requirements.

To signal the support of this feature (e.g., specific processing time N1' and/or N2'), some different schemes may be used. For example, the feature may be mandatory to be supported by all Release 16 UEs. Alternatively, it may be defined as a UE capability. For example, the UE capability may be defined as a single capability parameter. The UE capability may be defined per carrier. The UE capability may be defined per SCS.

The UE may be configured to enable or disable the specific processing time when a specific transmission is configured or performed. For example, the UE may be configured to enable/disable the specific processing time for certain component carriers (CCs). The UE may be configured to enable the specific processing time for a type-B scheduling, a type-A scheduling, or both. The UE may be configured to enable the specific processing time for time-division duplex (TDD) transmissions, frequency-division duplex (FDD) transmissions, or both. The UE may be configured to enable the specific processing time for frequency ranges 1 (FR1), frequency ranges 2 (FR2), or both. The UE may be configured to enable the specific processing time for uplink transmissions, downlink transmissions, or both. The UE may be configured to enable the specific processing time for configured grants, dynamic grants, or both. The UE may be configured to enable the specific processing time only for certain PDSCH/PUSCH sizes (e.g., a certain number of data orthogonal frequency-division multiplexing (OFDM) symbols). The UE may be configured to enable the specific processing time only for front-loaded demodulation reference signal (DMRS).

For scheduling request (SR)-based uplink transmission, in an event that the UE misses the decoding of uplink DCI of the initial transmission, then the initial PUSCH may be not sent by the UE. The network node may re-send the uplink DCI to schedule a retransmission. Under such scenario, the UE is not aware about the retransmission and may use the normal processing time for the retransmission unless it is signalled otherwise (e.g., implicit/explicit signalling). In an event that the UE decodes the uplink DCI of the initial transmission but the network node misses the initial PUSCH sent by the UE. The network node may re-send the uplink DCI to schedule a retransmission. Under such scenario, the UE is aware about the retransmission and may use the specific processing time for the retransmission unless it is signalled otherwise (e.g., implicit/explicit signalling).

Illustrative Implementations

Figure 2:
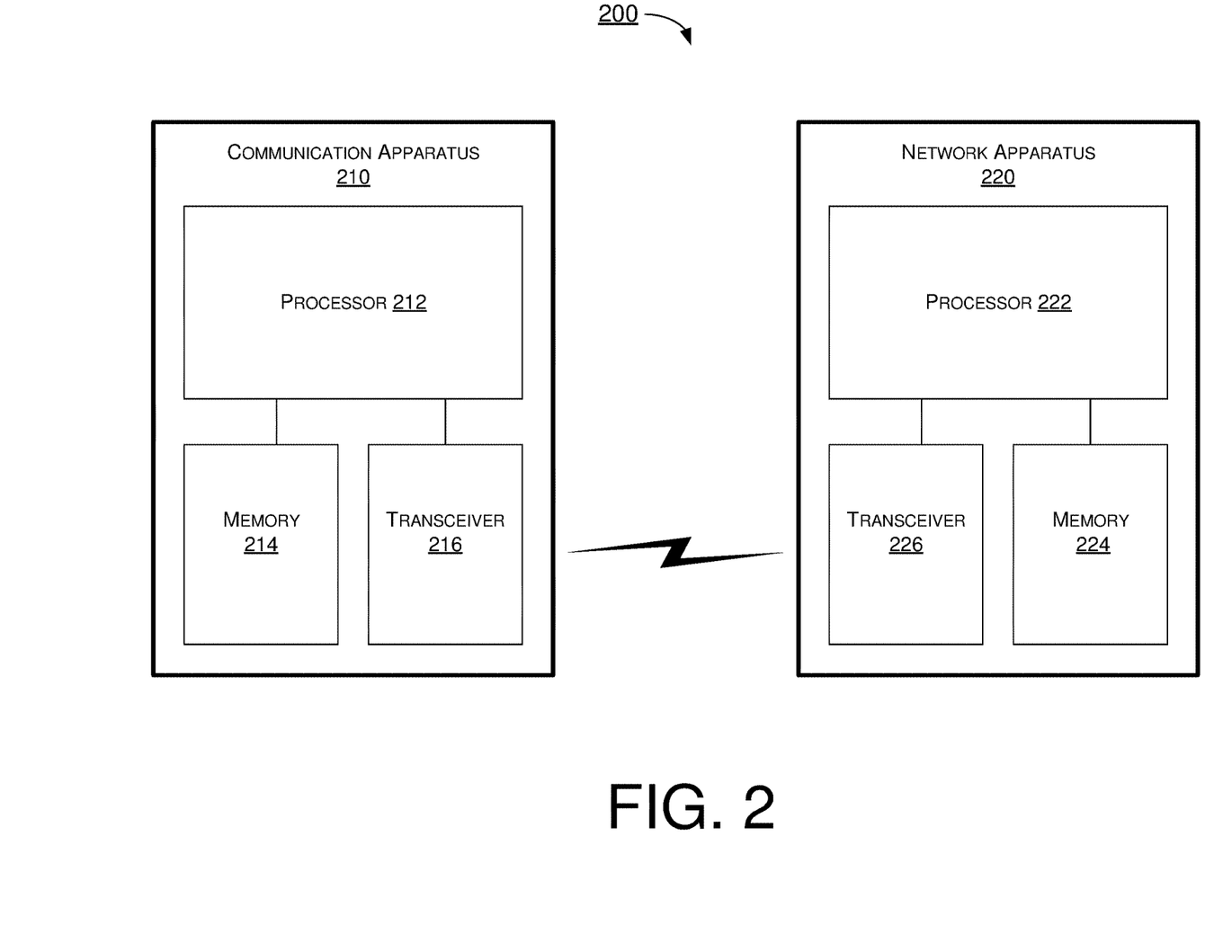
FIG. 2 is a block diagram of an example communication apparatus and an example network apparatus in accordance with an implementation of the present disclosure.
Figure 3:
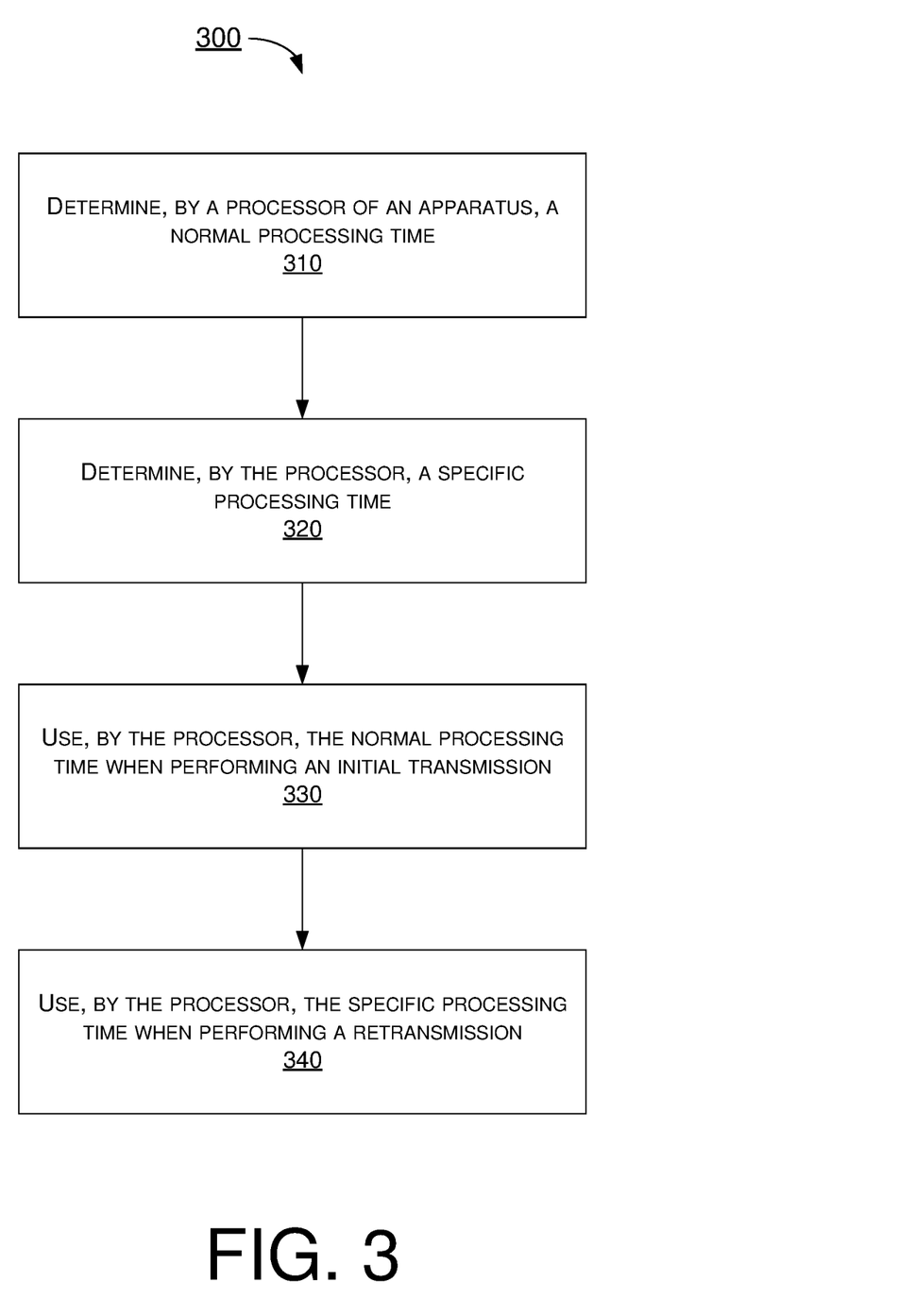
FIG. 3 is a flowchart of an example process in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to processing timeline enhancement with respect to user equipment and network apparatus in wireless communications, including scenarios/mechanisms described above as well as process 300 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT, NB-IoT or IIoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may be configured to perform, via transceiver 216, an initial transmission (e.g., PUSCH transmission) to transmit uplink data to the network node. The PUSCH transmission may be dynamically scheduled by an uplink grant in a DCI from network apparatus 220, or semi-statically configured to operate according to the configured grant from network apparatus 220. Processor 212 may be configured with a HARQ process. In an event that the initial transmission is not received by network apparatus 220, processor 222 may transmit, via transceiver 226, a NACK to communication apparatus 210 or may not transmit any feedback. In an event that the NACK is received or no response is received from network apparatus 220, processor 212 may be configured to perform, via transceiver 216, a retransmission to retransmit the uplink data.

In some implementations, processor 212 may be configured to determine a normal processing time. Processor 212 may be configured to determine a first normal processing time N1 and a second normal processing time N2. Processor 212 may be configured to determine a specific processing time. Processor 212 may be configured to determine a first specific processing time N1' and a second specific processing time N2'. N1 and N1' may be defined as the time needed for the PDSCH decoding and the HARQ-ACK feedback preparation. N2 and N2' may be defined as the PUSCH preparation time. The value of the normal processing time and the specific processing time may be pre-stored in memory 214 or configured by network apparatus 220. For example, the specific processing time N1'/N2' may be configured by the RRC signalling or dynamically signalled from network apparatus 220. Processor 212 may be configured to receive, via transceiver 216, a configuration of the specific processing time.

In some implementations, processor 212 may be configured to use the normal processing time when performing the initial transmission. Processor 212 may be configured to use the specific processing time when performing a retransmission. Specifically, since most of the tasks are very similar between the initial transmission and the retransmission, processor 212 may be configured to use more aggressive processing time or retransmission specific processing time (e.g., the specific processing time) for the retransmission. For example, processor 212 may be configured to store the data from the initial transmission. Processor 212 may be configured to reuse the data to perform the retransmission. Thus, processor 212 may skip some similar tasks (e.g., determining target code rate, channel encoding and modulation, or other preparation tasks) when performing the retransmission. Accordingly, processor 212 may be configured to use more aggressive processing time for the retransmission.

In some implementations, processor 212 may be configured to determine the specific processing time according to an offset value. Processor 212 may use the offset Δ for all numerologies or per numerology. For example, processor 212 may determine the specific processing time for the retransmission by N1−Δ. Processor 212 may use multiple values of Δ per SCS.

In some implementations, processor 212 may further be configured to determine whether a condition is satisfied. Processor 212 may enable the using of the specific processing time (e.g., N1' and/or N2') in an event that the condition is satisfied. For example, the condition may comprise using a processing capability #3 to perform the retransmission. Processor 212 may be configured to report, via transceiver 216, its capability to use it for all transmissions or for retransmission only. When performing the retransmission, processor 212 may be configured to use the UE processing capability #3 by applying the specific processing time. Alternatively, the condition may comprise that a number of PDCCH monitoring occasions is greater than a threshold. Processor 212 may trigger the specific processing time when the number of PDCCH monitoring occasions is greater than a certain threshold. For example, processor 212 may enable the specific processing time when PDCCH monitoring occasions per slot is equal or greater than 4.

In some implementations, the specific processing time may be mapped to certain RNTIs, search space, DCI format or size, CORESET. Processor 212 may derive the specific processing time based on that mapping. Processor 212 may be enabled/disabled semi-statically or dynamically to use the specific processing time. For example, communication apparatus 220 may use the RRC+DCI configuration. Multiple processing times may be configured or pre-specified via the RRC signalling and the value to be used may be indicated to processor 212 for each transmission. Communication apparatus 220 may include the indication in the DCI or implicitly derived from RNTIs, search spaces, DCI format or size, CORESET, etc.

In some implementations, processor 212 may be configured to enable or disable the specific processing time when a specific transmission is configured or performed. For example, processor 212 may be configured to enable/disable the specific processing time for certain CCs. Processor 212 may be configured to enable the specific processing time for a type-B scheduling, a type-A scheduling, or both. Processor 212 may be configured to enable the specific processing time for TDD transmissions, FDD transmissions, or both. Processor 212 may be configured to enable the specific processing time for FR1, FR2, or both. Processor 212 may be configured to enable the specific processing time for uplink transmissions, downlink transmissions, or both. Processor 212 may be configured to enable the specific processing time for configured grants, dynamic grants, or both. Processor 212 may be configured to enable the specific processing time only for certain PDSCH/PUSCH sizes. Processor 212 may be configured to enable the specific processing time only for front-loaded DMRS.

In some implementations, in an event that processor 212 misses the decoding of uplink DCI of the initial transmission, then the initial PUSCH may be not sent by processor 212. Network apparatus 220 may re-send the uplink DCI to schedule a retransmission. Under such scenario, processor 212 is not aware about the retransmission and may use the normal processing time for the retransmission unless it is signalled otherwise (e.g., implicit/explicit signalling). In an event that processor 212 decodes the uplink DCI of the initial transmission but network apparatus 220 misses the initial PUSCH sent by processor 212. Network apparatus 220 may re-send the uplink DCI to schedule a retransmission. Under such scenario, processor 212 is aware about the retransmission and may use the specific processing time for the retransmission unless it is signalled otherwise (e.g., implicit/explicit signalling).

Illustrative Processes

FIG. 3 illustrates an example process 300 in accordance with an implementation of the present disclosure. Process 300 may be an example implementation of above scenarios/schemes, whether partially or completely, with respect to UE processing timeline enhancement with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 determining a normal processing time. Process 300 may proceed from 310 to 320.

At 320, process 300 may involve processor 212 determining a specific processing time. Process 300 may proceed from 320 to 330.

At 330, process 300 may involve processor 212 using the normal processing time when performing an initial transmission. Process 300 may proceed from 330 to 340.

At 340, process 300 may involve processor 212 using the specific processing time when performing a retransmission.

In some implementations, the normal processing time may comprise a first normal processing time N1 and a second normal processing time N2. The specific processing time may comprise a first specific processing time N1' and a second specific processing time N2'.

In some implementations, the first specific processing time N1' may be less than the first normal processing time N1. The second specific processing time N2' may be less than the second normal processing time N2.

In some implementations, process 300 may involve processor 212 storing data from the initial transmission. Process 300 may further involve processor 212 reusing the data to perform the retransmission.

In some implementations, process 300 may involve processor 212 determining the specific processing time according to an offset value.

In some implementations, process 300 may involve processor 212 receiving a configuration of the specific processing time.

In some implementations, process 300 may involve processor 212 determining whether a condition is satisfied.

Process 300 may further involve processor 212 enabling the using of the specific processing time in an event that the condition is satisfied.

In some implementations, the condition may comprise using a processing capability #3 to perform the retransmission.

In some implementations, the condition may comprise that a number of PDCCH monitoring occasions is greater than a threshold.

In some implementations, the condition may comprise that a specific transmission is configured.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, a normal processing time;
   determining, by the processor, a specific processing time;
   using, by the processor, the normal processing time when performing an initial transmission; and
   using, by the processor, the specific processing time when performing a retransmission,
   wherein the determining of the specific processing time comprises determining the specific processing time according to an offset value ($\Delta$) with multiple values of $\Delta$ defined per sub-carrier spacing (SCS).

2. The method of claim 1, wherein the normal processing time comprises a first normal processing time N1 and a second normal processing time N2, and wherein the specific processing time comprises a first specific processing time N1' and a second specific processing time N2'.

3. The method of claim 2, wherein the first specific processing time N1' is less than the first normal processing time N1, and wherein the second specific processing time N2' is less than the second normal processing time N2.

4. The method of claim 1, further comprising:
   storing, by the processor, data from the initial transmission; and
   reusing, by the processor, the data to perform the retransmission.

5. The method of claim 1, further comprising:
   determining, by the processor, whether a condition is satisfied; and
   enabling, by the processor, the using of the specific processing time in an event that the condition is satisfied.

6. The method of claim 5, wherein the condition comprises using a processing capability #3 to perform the retransmission.

7. The method of claim 5, wherein the condition comprises that a number of physical downlink control channel (PDCCH) monitoring occasions is greater than a threshold.

8. The method of claim 5, wherein the condition comprises that a specific transmission is configured.

9. An apparatus, comprising:
a transceiver which, during operation, wirelessly communicates with network nodes of a wireless network; and
a processor communicatively coupled to the transceiver such that, during operation, the processor performs operations comprising:
determining a normal processing time;
determining a specific processing time;
using the normal processing time when performing an initial transmission; and
using the specific processing time when performing a retransmission,
wherein, in determining the specific processing time, the processor is configured to determine the specific processing time according to an offset value ($\Delta$) with multiple values of $\Delta$ defined per sub-carrier spacing (SCS).

10. The apparatus of claim 9, wherein the normal processing time comprises a first normal processing time N1 and a second normal processing time N2, and wherein the specific processing time comprises a first specific processing time N1' and a second specific processing time N2'.

11. The apparatus of claim 10, wherein the first specific processing time N1' is less than the first normal processing time N1, and wherein the second specific processing time N2' is less than the second normal processing time N2.

12. The apparatus of claim 9, wherein, during operation, the processor further performs operations comprising:
storing data from the initial transmission; and
reusing the data to perform the retransmission.

13. The apparatus of claim 9, wherein, during operation, the processor further performs operations comprising:
determining whether a condition is satisfied; and
enabling the using of the specific processing time in an event that the condition is satisfied.

14. The apparatus of claim 13, wherein the condition comprises using a processing capability #3 to perform the retransmission.

15. The apparatus of claim 13, wherein the condition comprises that a number of physical downlink control channel (PDCCH) monitoring occasions is greater than a threshold.

16. The apparatus of claim 13, wherein the condition comprises that a specific transmission is configured.

\* \* \* \* \*